United States Patent [19]

Lerma et al.

[11] 4,090,242
[45] May 16, 1978

[54] METHOD AND MEANS FOR EVALUATING PHASE ENCODED COMMUNICATION SYSTEMS

[75] Inventors: Jesse P. Lerma, La Habra; Charles A. Lindquist, Whittier, both of Calif.

[73] Assignee: Odetics, Inc., Anaheim, Calif.

[21] Appl. No.: 705,699

[22] Filed: Jul. 15, 1976

[51] Int. Cl.² .................. G04F 10/04; H04B 1/16; G06M 11/00
[52] U.S. Cl. .................. 364/514; 325/325; 328/39; 364/484; 364/554
[58] Field of Search ............. 235/151.31, 92 FQ, 152; 325/38 A, 38 R, 325; 307/208, 220 R, 269, 271; 328/39, 63, 72, 108, 109, 140; 178/88; 364/484, 486, 514, 554

[56] References Cited

U.S. PATENT DOCUMENTS

| | | | |
|---|---|---|---|
| 3,168,655 | 2/1965 | Vadus | 307/220 R |
| 3,495,077 | 2/1970 | Hiltz et al. | 325/325 |
| 3,626,168 | 12/1971 | Norsworthy | 235/151.31 |
| 3,693,097 | 9/1972 | Band | 328/39 |
| 3,705,398 | 8/1970 | Kostenbauer et al. | 325/38 A |
| 3,714,437 | 1/1973 | Kinsel | 325/38 A |
| 3,746,847 | 7/1973 | Maritsas | 235/152 |
| 3,852,574 | 12/1974 | Bilgutay et al. | 235/92 FQ |
| 3,865,981 | 2/1975 | Welch et al. | 328/63 |
| 3,988,676 | 10/1976 | Whang | 325/38 A |

OTHER PUBLICATIONS

Smith et al.; Simulation of Continuous Random Phenomena; Instruments & Control Systems, vol. 41, Jun. 1968, pp. 119-123.

*Primary Examiner*—Malcolm A. Morrison
*Assistant Examiner*—Errol A. Krass
*Attorney, Agent, or Firm*—Philip M. Hinderstein

[57] ABSTRACT

In a system wherein transitions occur in a data signal encoded with a known format and transition displacements occur as a result of bandwidth limitations, noise, and the like, there is disclosed a method and means for measuring the probability density function associated with such transition displacements. Furthermore, the present system permits the measurement of conditional probability such that the probability density function associated with certain selected transitions can be separately evaluated. The probability density function associated with transition displacements is measured by measuring the average frequency of occurrence of transitions of the data within a narrow, first time interval, varying the first time interval over a larger, second time interval during which transitions of the data are expected to occur, and plotting the average frequency of occurrence of data transitions determined at each first interval.

12 Claims, 6 Drawing Figures

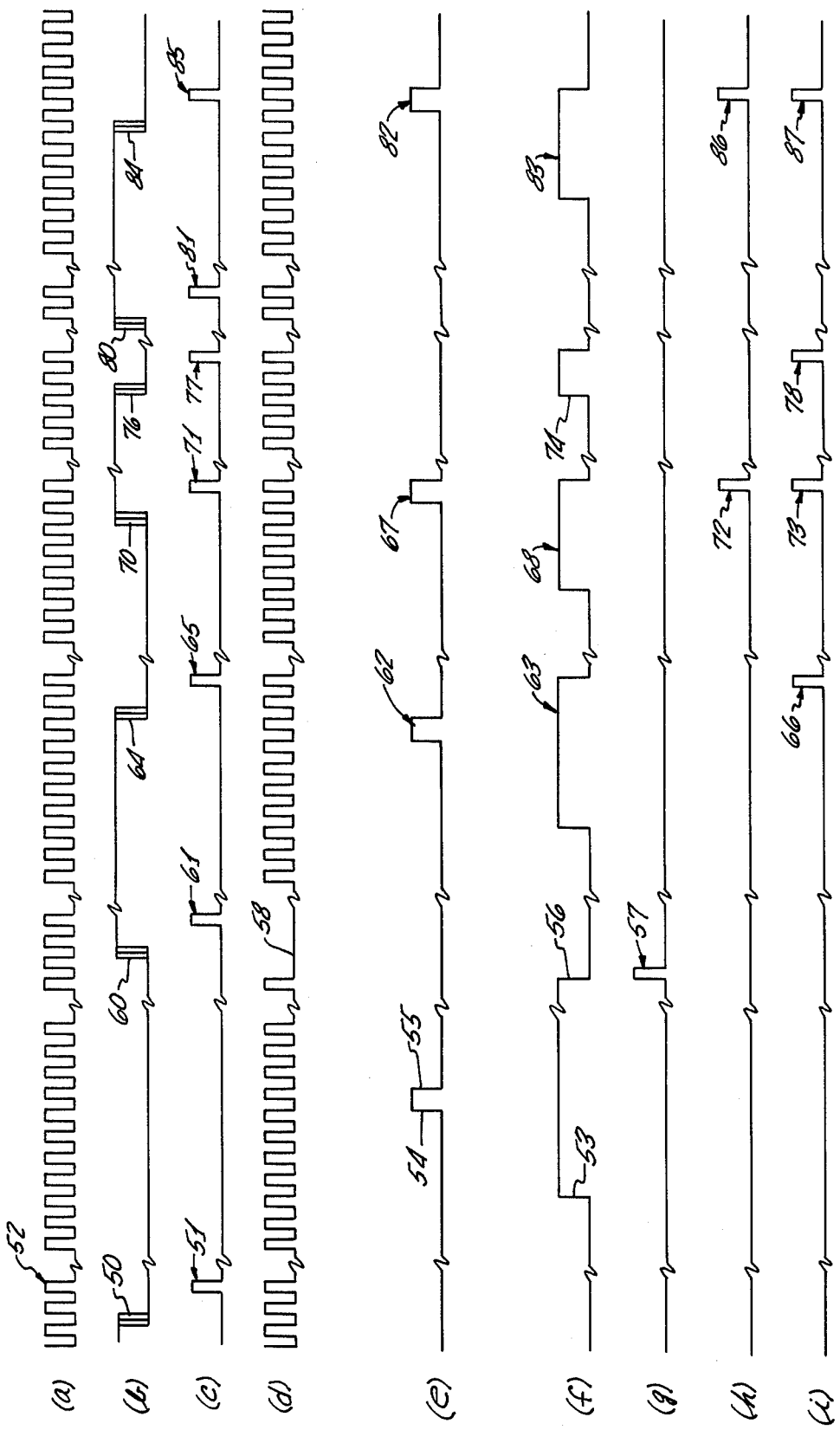

METHOD AND MEANS FOR EVALUATING PHASE ENCODED COMMUNICATION SYSTEMS

BACKGROUND OF THE INVENTION

1. Field of the Invention.

The present invention relates to a method and means for evaluating phase encoded communication systems and, more particularly, to a method and means for determining the probability density function associated with transition displacements of a data signal encoded with a known format.

2. Description of the Prior Art.

Conventional data handling systems usually require input digital data to be phase encoded in accordance with the standard non-return-to-zero (NRZ) format. In the NRZ format, a "0" is represented by an output signal at a first voltage level and a "1" is represented by an output signal at a second, higher voltage level. Since several bit cells may occur without a transition of the data from one voltage level to the other, NRZ encoded data is usually accompanied by a coherent clock signal which defines the boundaries of the bit cells.

When transmitting serial digital data over a data communication network, it is desirable to encode such data in accordance with a self-clocking format so that a separate clock signal need not be transmitted. Elimination of the separate clock signal eliminates the necessity for an additional communications channel.

Many self-clocking codes are presently in existence and are widely used. Self-clocking codes are those in which transitions are caused to occur with a regularity sufficient to limit the d.c. spectral content of the encoded signal and to provide timing information for clock reconstruction. In other words, in all self-clocking codes, the information to be transmitted is contained, not only in the level of the waveform but, additionally, in the time of occurrence of the transition from one level to the other. The most popular self-clocking codes can be considered as either bi-phase or double density. However, other self-clocking codes exist.

Where digital data, which is encoded in accordance with a self-clocking format, is transmitted over a communications channel to eliminate the necessity for transmitting a separate clock signal, it becomes necessary, at the receiving location, to convert the data to its NRZ format equivalent for application to a shift register or other data handling system. It is also necessary to generate a coherent clock signal to define the boundaries of the bit cells. Apparatus for converting serial digital data which is phase encoded in accordance with any self-clocking format to its NRZ format equivalent accompanied by a coherent clock signal is known to those skilled in the art.

Practical digital communications channels and digital recording systems in particular, are both bandwidth limited and noisy. Bandwidth limiting results in a phenomenon referred to as intersymbol interference in which the symbols of the data format become smeared in time and tend to overlap. The result of this process is manifested as data dependent amplitude and phase distortions. The noise present on the channel may further corrupt the amplitude and phase of the signal. Since it is common practice to remove the amplitude variations of the received or reproduced data by limiting techniques, the overall effect of intersymbol interference and noise is most commonly manifested as random displacements (jitter) of the data transitions. Should a displacement occur beyond the limits of the receiving station to absorb, such displaced transition may cause the receiving station decoder to incorrectly decode the data, producing an error.

When designing a communications system, it is very difficult to predict what the error rate will be. Therefore, once a system is designed and it becomes necessary to find out how good it is, about the only thing that can be done is to test the system and determine its error rate. If the system is designed properly, as a practical matter, it will operate below the threshold of error most of the time. Therefore, a measurement of errors alone often gives no information as to how much margin there is against a wrong decision. In other words, the decoder has certain limits and an error will only be indicated when a transition is sufficiently displaced to go beyond the boundaries of the decoder. If transitions are in fact being displaced but are not sufficiently displaced to go beyond the boundaries of the decoder, then the decoder does not communicate that an error has occurred. Therefore, no useful information as to the margin against an error is provided.

In general, the measurement of data signal distortion involves the measurement of the time displacement of the signal transitions from their normal undistorted positions. A variety of techniques have been developed for making such a measurement. However, many of such systems operate on assumptions which prove, in practice, to be invalid. For example, some systems operate on the assumption that phase error can be characterized as a Gaussian distributed random variable and such an assumption, in many cases, is unwarranted. Accordingly, the assessment of system performance based on such an assumption may well lead to an erroneous conclusion.

Many methods of signal analysis are based on oscilloscope displays. In every case, however, the measurements are limited by the persistence of the scope phosphor and human contrast perception and these are severely limiting factors.

Still other systems restrict the input data to a fixed frequency. Since that jitter occurring as the result of intersymbol interference can be evaluated only when the data is permitted to assume all possible encoded states, the contribution of intersymbol interference to the overall displacement of transitions is clearly not measurable if the frequency of the data is arbitrarily fixed.

SUMMARY OF THE INVENTION

According to the present invention, there is provided a method and means for evaluating phase encoded communications systems which permits a direct measurement of the time displacement of signal transitions from their normal undistorted positions in a manner which gives a precise indication of the margin against a wrong decision. The present system does not require the making of assumptions which may not, in practice, be valid. Only assuming that the noise associated with transition displacements approximates a stationary random process, the present system is based on the fact that there exists a sample probability density function which is related to the probability density function associated with transition displacements. If the probability density function associated with transition displacements can be measured, the probability of error of the system can be inferred. Rather than attempting to evaluate analytically the probability density function associated with transition displacements, the present method and means permits the measurement of conditional probability such that the probability density function associated with certain selected transitions can be evaluated, independently of other transitions.

Briefly, the conditional probability density function associated with transition displacements is measured by separately measuring the average frequency of occurrence of transitions of the data within a narrow, first time interval, varying the first time interval over a larger, second time interval during which transitions of the data are expected to occur, and plotting the average frequency of occurrence of data transitions determined at each first interval.

According to a preferred embodiment of the invention, the means for evaluating phase encoded communication systems comprises: means responsive to a transition of a data signal for generating a first gating pulse which begins at a known time $t_1$ following the transition and terminates at a known time $t_2$ following the transition, the first gating pulse establishing a first given time interval; first gating means responsive to the data and the first gating pulse for passing subsequent transitions of the data occurring during the first gating pulse; means responsive to a transition of the data for generating a second gating pulse which begins at a known time $t_3$ following the transition and terminates at a known time $t_4$ following the transition, the time $t_3$ occurring at or prior to the time $t_1$ and the time $t_4$ occurring at or after the time $t_2$, the second gating pulse establishing a second time interval during which transitions of the data are expected to occur; second gating means responsive to the data and the second gating pulse for passing subsequent transitions of the data occurring during the second gating pulse; and counting means responsive to the first and second gating means for dividing the output of the first gating means by the output of the second gating means to determine the average frequency of occurrence of transitions of the data within the time interval from $t_1$ to $t_2$. By determining the average frequency of occurrence of transitions of the data within different first time intervals covering the entire range from $t_1 = t_3$ to $t_2 = t_4$, the probability density function associated with transition displacements from $t_3$ to $t_4$ can be plotted.

OBJECTS

It is therefore an object of the present invention to provide a method and means for evaluating phase encoded communication systems.

It is a further object of the present invention to provide a method and means for determining the probability density function associated with transition displacements of a data signal encoded with a known format.

It is a still further object of the present invention to provide a method and means for determining conditional probability associated with transition displacement in a phase encoded data signal.

It is another object of the present invention to provide a method and means for directly measuring conditional probability associated with certain selected transitions of a data signal, independently of other transitions.

Still other objects, features, and attendant advantages of the present invention will become apparent to those skilled in the art from a reading of the following detailed description of the preferred embodiment constructed in accordance therewith, taken in conjunction with the accompanying drawings wherein:

BRIEF DESCRIPTION OF THE DRAWINGS

FIG. 5 is a series of waveforms useful in explaining the operation of the system of FIG. 4.

DESCRIPTION OF THE PREFERRED EMBODIMENT

Figure 1:
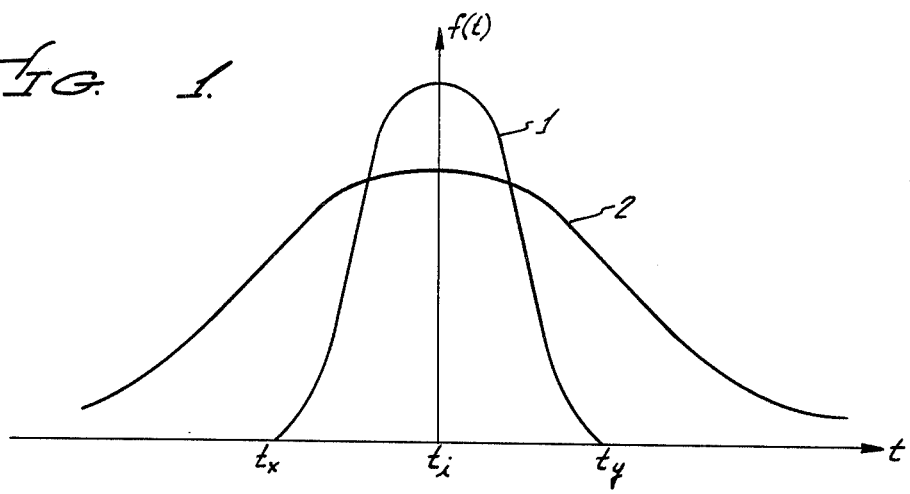
FIG. 1 is a series of waveforms showing the nature of a probability density function.

Referring now to FIG. 1, there is shown a pair of curves, 1 and 2, which represent two possible probability density functions. Generally speaking, probability, the ordinate in FIG. 1, is a number from zero to one. The abscissa in FIG. 1 is time, $t$. In the present case, we're considering transitions in data and it is assumed that a transition of the data is expected to occur at a time $t_i$. In the absence of bandwidth limitations, noise, and the like, so that there are no distortions in the transmitted signal and no displacements in the transmitted data, there would be a spike at time $t_i$ having an infinitely narrow width and an infinite height. That is, the area under the curve must be normalized to have unity area. The noise process, however, adds a random component to the signal, which tends to smear the occurrence of transitions about $t_i$. Therefore, rather than all transitions occurring exactly at $t_i$, there is a set of possible values of $t$ at which transitions may occur. Assuming a stationary random process, a continuous probability density function $f(t)$ is thus formed.

Curves 1 and 2 represent two possible probability density functions for two communication systems. The two density functions are related in that the area beneath both curves has to always equal one. Since the maximum amplitude of curve 2 is smaller than that of curve 1, and since the area beneath both curves always equals one, the transitions which previously occurred between $t = t_x$ and $t = t_y$ for the system having the probability density function represented by curve 1 have to be spread in time to times prior to $t_x$ and after $t_y$ for the system having the probability density function represented by curve 2. The result is that a slight decrease or change in the height of the probability density curve may cause an exponential increase in the area of the curve outside of the limits of $t_x$ and $t_y$. Accordingly, if $t_x$ and $t_y$ are the decoder boundaries, being able to measure the probability density function associated with transition displacements for a particular communications system will give a basis for inferring the probability of error of the system. According to the present invention, a phase encoded communication system may be evaluated by directly measuring the probability density function associated with transition displacements of such system.

Figure 2:
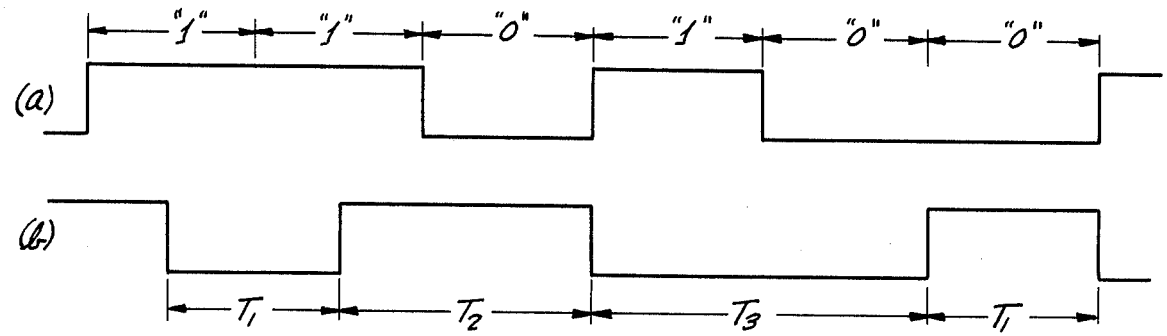
FIG. 2 is a series of waveforms showing a typical NRZ data signal and its double density format equivalent.

Furthermore, in accordance with the present invention, conditional probability can also be measured. For example, and referring to FIG. 2, waveform (a) shows a representation of binary data in the standard NRZ format in which a "0" is represented by an output signal at a first voltage level and a "1" is represented by an output signal at a second, higher voltage level. Waveform (b) in FIG. 2 shows the double density format equivalent of the NRZ data where a "0" is represented by a transition, either from a high voltage level to a low voltage level, or visa versa, at the end of a bit cell and a "1" is represented by a transition in the center of the bit cell if the previous bit was also a "1". On the other hand, if the previous bit was a "0", a "1" is represented by the absence of a transition in that bit cell.

Figure 3:
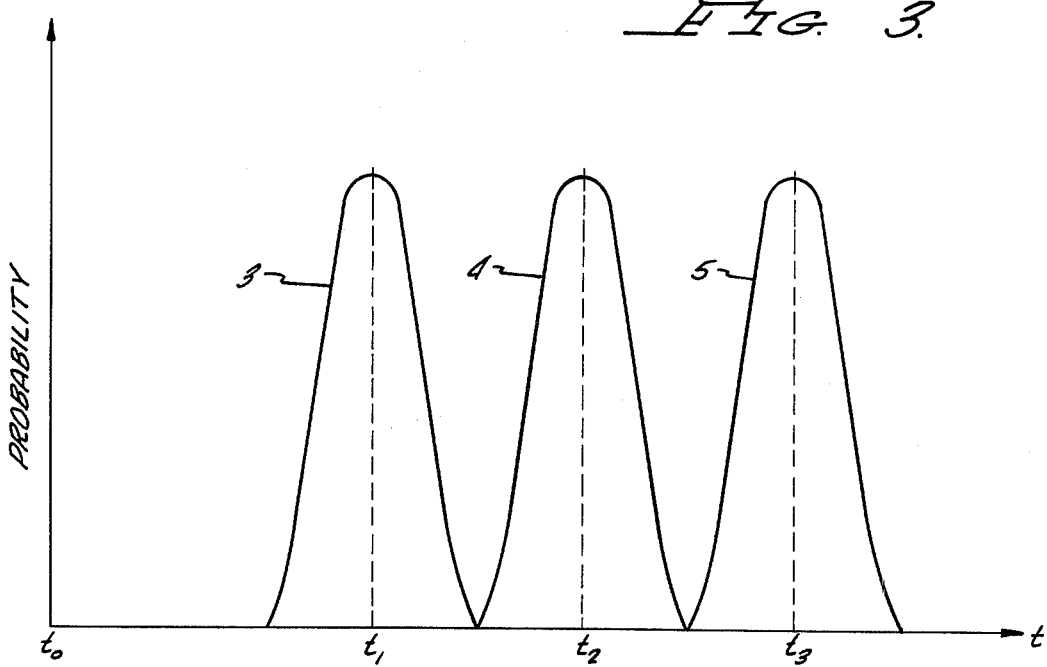
FIG. 3 is a series of waveforms showing possible probability density functions associated with transition displacements of a data signal such as that shown in FIG. 2.

It is evident from an inspection of waveform (b) in FIG. 2 that the encoded binary information is represented in terms of the delay time between transitions of the signal. There are three such discrete delays which may be denoted by $T_i$, $i = 1, 2, 3$. Now, a possible probability density function for a communication system transmitting the data signal of FIG. 2 is represented by the curves 3, 4, and 5 shown in FIG. 3. In other words, there are three separate and independent conditional probability density functions 3, 4, and 5, centered at times $t_1$, $t_2$, and $t_3$ which are spaced from time $t_0$, when the last transition occurred, by the intervals $T_1$, $T_2$, and $T_3$. Due to the properties of conditional probability, the area under each of curves 3, 4, and 5 should also be one. According to the present invention, the practical limits over which a transition can be expected to occur is determined, by virtue of the known format, independently for each time interval and the probability of each transition displacement is separately plotted. This will be explained more fully hereinafter with regard to the system of FIG. 4 and the waveforms of FIG. 5.

Figure 4:
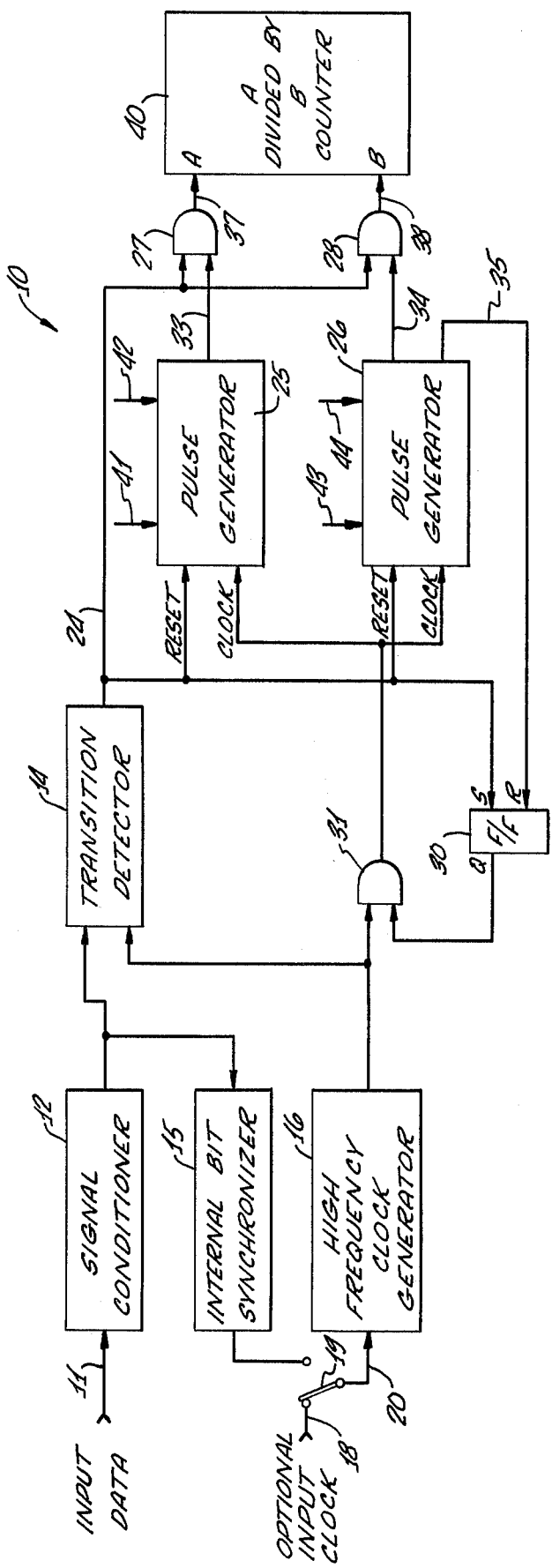
FIG. 4 is a block diagram of the present system for evaluating phase encoded communication systems.

Referring now to FIG. 4, the present means for evaluating phase encoded communication systems, generally designated 10, is responsive to transitions of a data signal for determining the frequency of occurrence of subsequent transitions of the data within a first, narrow time interval and also for determining the frequency of occurrence of subsequent transitions of the data within a second, larger time interval, the second time interval encompassing the first time interval, but being substantially greater in length so as to encompass the entire interval over which transitions are expected to occur. By dividing the frequency of occurrence of transitions of the data within the first time interval by the frequency of occurrence of transitions of the data within the second time interval, the average frequency of occurrence of transitions of the data within the first time interval may be determined. Thereafter, by varying the first time interval throughout the range encompassed by the second time interval, one can determine the average frequency of occurrence of transitions of the data within a series of narrow time intervals encompassing the second time interval. This permits a determination of the actual probability density function associated with transition deviations for the data.

System 10 received input data over a line 11 from a tape recorder or other communications link and applies such input data to a signal conditioner 12. Signal conditioner 12 is operative, in response to the input data, to generate essentially a square wave having transitions corresponding to transitions of the data. Thus, signal conditioner 12 eliminates amplitude variations of the received or reproduced data. By way of example, signal conditioner 12 may include an amplifier for increasing the amplitude of the input signal to a desired level, a limiter for removing amplitude variations, and a Schmitt trigger responsive to the zero crossings of the signal for providing vertical transitions in the data. The output of signal conditioner 12 is conducted simultaneously to a transition detector 14 and an internal bit synchronizer 15.

Master timing for system 10 is provided by a high frequency clock generator 16 which generates a series of clock pulses at N times the data rate. If the data rate is fixed and known, clock generator 16 may be synchronized to the data from an external clock signal which is conducted over a line 18 and a switch 19 to the input 20 of clock generator 16. Alternatively, system 10 can generate its own clock by connecting switch 19 to the output of internal bit synchronizer 15. A synchronizer which is responsive to transitions of digital data for generating a coherent clock signal and suitable for use as internal bit synchronizer 15 for the double density format is described in U.S. Pat. No. 3,865,981, issued Feb. 11, 1975, and assigned to Odetics, Inc., the assignee of the present application. In general, other formats will require converters specific to the format. The choice and design of such converters will be apparent to those skilled in the art.

The output of clock generator 16 is applied as a second input to transition detector 14. In this manner, asynchronous transitions of the input data are synchronized to the N-times clock. That is, transition detector 14 generates a pulse at a fixed interval after each transition. Transition detector 14 may be implemented in a manner similar to the implementation of the data synchronizer of U.S. Pat. No. 3,705,398, issued Dec. 5, 1972, and assigned to Odetics, Inc., the assignee of the present application, and may include a series of flip-flops which are clocked by clock generator 16 and initiated by the data signal from signal conditioner 12.

The transition detected pulses at the output of transition detector 14, on a line 24, are applied to the reset inputs of a pair of identical pulse generators 25 and 26, to first inputs of a pair of identical AND gates 27 and 28, and to the set input terminal of a flip-flop 30. The Q output of flip-flop 30 is applied to one input of an AND gate 31 which receives its other input from clock generator 16. The output of gate 31 is connected to the clock inputs of pulse generators 25 and 26. The output of pulse generator 25, on a line 33, is connected to the other input of AND gate 27 whereas the output of pulse generator 26, on a line 34, is connected to the other input of AND gate 28. Pulse generator 26 also generates an inhibit pulse on a line 35 which is conducted to the reset input of flip-flop 30. Finally, the outputs of AND gates 27 and 28, on lines 37 and 38, respectively, are applied to the A and B inputs, respectively, of an A-divide-by-B counter 40.

Pulse generators 25 and 26 are variable width, variable delay, digital pulse generators. That is, from the time that a transition occurs, as indicated by a pulse on line 24 from transition detector 14, each of pulse generators 25 and 26 waits for a predetermined time delay and then generates a gating pulse, over lines 33 and 34, respectively, having predetermined widths. The delays are in increments of the N-times clock and are individually selectable. Furthermore, the widths of the gating pulses are also in increments of the N-times clock and are individually selectable. Thus, pulse generator 25 receives external command inputs over lines 41 and 42, the input on line 41 determining the delay from the transition of the data to the initiation of the gating pulse and the input on line 42 determining the delay from the transition of the data to the termination of the gating pulse. Pulse generator 26 receives similar external command inputs over lines 43 and 44, respectively.

By way of example and not of limitation, each of pulse generators 25 and 26 may have first and second counters which are reset to a starting count by a transition detected pulse on line 24 from transition detector 14 and which count clock pulses from clock generator 16, via AND gate 31. In other words, assume that pulse generator 25 includes two eight-stage counters capable of counting from zero to 63. Also assume that the first counter in pulse generator 25 is to delay 20 counts of the N-times clock before initiating a gating pulse on line 33. Accordingly, input line 41 presets the first counter in generator 25 to a count of 43. When a transition is detected by generator 14 and a pulse is applied over line 24 to reset generator 25, the first counter therein is reset to a count of 43 and then begins counting clock pulses from generator 16. Upon detecting the terminal state of the first counter in generator 25, which would occur after 20 counts, a count of 63, the next clock resetting each counter to zero, a flip-flop may be set and the gating pulse at the output of generator 25 is initiated.

Simultaneously, the second counter in generator 25, which was reset by transition detector 14 to a preset count determined by input 42, is enabled to start counting clock pulses. When the second counter in generator 25 reaches its terminal state, the flip-flop is reset and the gating pulse at the output of generator 25 terminates. If generator 25 is to generate a very narrow gating pulse, the second counter therein could be preset by a signal over line 42 to a count of 62 so that the second counter only counts a single clock pulse before reaching its terminal state. However, the use of two counters in pulse generator 25 permits individual flexibility in both the delay of the gating pulse output thereof and the width thereof.

The gating pulse from generator 25 on line 33 and the output of transition detector 14 on line 24 are applied to the inputs of AND gate 27. Accordingly, if a subsequent transition in the data occurs during the gating pulse from generator 25, such transition is passed via line 37 to the numerator input of counter 40. Thus, pulse generator 25 and AND gate 27 operate in response to transitions in the data for determining the frequency of occurrence of subsequent transitions of the data within a given time interval, which time interval would be a small portion of the total expected range of times of transitions in the data.

Pulse generator 26 operates in a manner identical to pulse generator 25. On the other hand, pulse generator 26 establishes the total range of expected times of occurrence of transitions of the data following a previous transition of the data. For example, and referring to FIG. 1, if a transition of the data would be expected over the range from $t_x$ to $t_y$, pulse generator 26 would establish a corresponding time interval, while pulse generator 25 would establish a much smaller time interval within the time interval from $t_x$ to $t_y$. If a transition is detected by detector 14 during the gating pulse generated by pulse generator 26, such transition is transmitted by gate 28 to the denominator input of counter 40.

Upon the termination of the gating pulse generated by generator 26, a signal is applied via line 35 to the reset input of flip-flop 30. This removes the enabling input from gate 31 so that subsequent clock pulses from generator 16 are inhibited from clocking generators 25 and 26 until a subsequent transition of the data resets generators 25 and 26 and sets flip-flop 30. The reason for this will be apparent from a consideration of FIG. 3. That is, if pulse generator 26 has its delay and pulse width adjusted to investigate transition displacements on either side of time $t_1$, and no such transition occurs, pulse generators 25 and 26 will continue to count clock pulses from generator 16 until the next transition is detected by detector 14. Since the counters in generators 25 and 26 are recirculating counters, it is conceivable that a second set of gating pulses will be generated by generators 25 and 26 at times which will correspond to a transition occurring at a time approximately equal to $t_2$ or $t_3$, although these transitions are not being presently investigated. Therefore, and to prevent this from occurring, as soon as the gating pulse from pulse generator 26 terminates, gate 31 is inhibited so that pulse generators 25 and 26 stop counting until a subsequent transition of the data resets generators 25 and 26 and sets flip-flop 30.

Conversely, if generators 25 and 26 are investigating the frequency of occurrence of a data transition occurring at a time $t_2$ following a transition at a time $t = 0$ and if a transition occurs at a time $t_1$, it will be evident that such transition will not occur within the gates established by generators 25 and 26 and that generators 25 and 26 will be reset to wait for another transition in the data at a time $t_2$ following a previous transition at a time $t = 0$.

Figure 6:
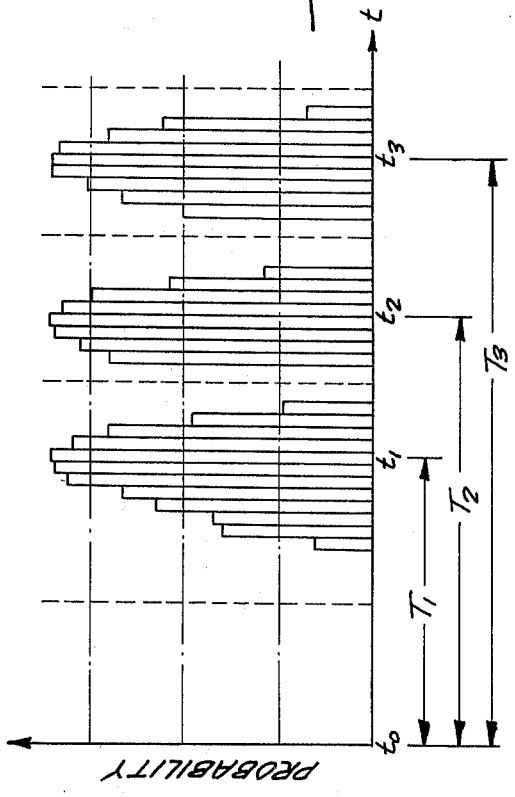
FIG. 6 is a typical plot of a probability density function measured by the system of FIG. 4.

It will be obvious that after a predetermined period of time, counter 40 will accumulate a count indicative of the frequency of occurrence of transitions of the data within the time interval established by generator 25 divided by transitions of the data within the time interval established by generator 26. After this count is read out from counter 40 and plotted, the procedure can be repeated with the window established by generator 25 shifted to another interval within the total range established by generator 26. The result of repeated measurements for a signal such as that shown in FIG. 2 is shown in FIG. 6. This establishes a probability density function associated with transitions of the data within each area of interest.

The operation of system 10 will now be described in connection with the waveforms of FIG. 5. A typical input signal, phase encoded in accordance with a self-clocking format, is shown as waveform (b) in FIG. 5, such data signal appearing at the output of signal conditioner 12. Waveform (a) shows the N-times clock at the output of clock generator 16 whereas waveform (d) shows the gated N-times clock at the output of gate 31. Waveform (c) shows the output of transition detector 14 on line 24 and is a pulse, synchronized to the N-times clock, occurring at a predetermined time interval after each transition of the data. Waveform (e) shows a possible gating pulse appearing on line 33 at the output of pulse generator 25 whereas waveform (f) shows a possible gating pulse appearing on line 34 at the output of pulse generator 26. It should be noted that the gating pulses in waveform (e) have a width substantially shorter than the gating pulses of waveform (f) and occur during the time of occurrence thereof. Waveform (g) shows a clock inhibit pulse generator on line 35 at the output of generator 26. Waveforms (h) and (i) show the outputs on lines 37 and 38, respectively, from AND gates 27 and 28, respectively.

In response to the transition in the data occurring at 50, detector 14 generates a pulse, at 51, synchronized with the clock pulse at 52. Pulse 51 resets generators 25 and 26 and sets flip-flop 30 so that clock pulses are conducted from generator 17 to the clock inputs of generators 25 and 26. The first counters in pulse generators 25 and 26 will now begin to count clock pulses from their present counts established by the inputs over lines 41 and 43, respectively, until they reach their terminal states. Upon the first counter therein reaching its terminal state, pulse generator 26 will initiate a gating pulse, at 53. Similarly, pulse generator 25 will subsequently initiate a gating pulse, at 54. Pulses 53 and 54 initiate the second counters in generators 26 and 25, respectively, which begin counting clock pulses until they reach their terminal states. Upon the second counter therein reaching its terminal state, pulse generator 25 will terminate its gating pulse, at 55. Subsequently, generator 26 will terminate its gating pulse, at 56. Since no subsequent transitions occur following the transition at 50 during the time interval established by generator 26, no signals are transmitted by AND gates 27 and 28 to counter 40. Furthermore, upon the termination of the clock pulse from generator 26, at 56, an inhibit pulse 57 is generated by generator 26 to reset flip-flop and to remove the enable input from gate 31. Thus, no further clock pulses are conducted to generators 25 and 26, as shown at 58 in waveform (d).

System 10 now waits until the next transition of the data signal, at 60. This transition generates a pulse 61 at the output of detector 14 which repeats the process described previously so that generators 25 and 26 generate gating pulses 62 and 63, respectively. The next transition of the data signal, at 64, results in a transition detected pulse 65 at the output of detector 14 which occurs after pulse 62 from generator 25 but during pulse 63 from generator 26. Accordingly, pulse 65 appears at the output of gate 28, as shown at 66 in waveform (i), and pulse 66 is applied to the B input of counter 40. It will also be seen that pulse 65 immediately terminates pulse 63 since it resets both generators 25 and 26 to begin looking for the next transition. Therefore, not only does transition detected pulse 65 result in an input to the B input of counter 40, but it also causes the generation of subsequent gating pulses 67 and 68 at the output of generators 25 and 26, respectively.

The next transition of the data, at 70, results in a transition detected pulse 71 at the output of detector 14. Since pulse 71 now occurs simultaneously with gating pulses 67 and 68, pulse 71 results in pulses 72 and 73 at the outputs of gates 27 and 28, respectively, on lines 37 and 38, respectively. Accordingly, inputs are applied to both A and B inputs to counter 40. As described previously, pulse 71 also terminates gating pulses 67 and 68 and resets generators 25 and 26.

After its preset delay, generator 26 initiates a gating pulse, at 74, in response to transition detected pulse 71. Before the delay established by generator 25, the next transition of the data, at 76, causes the generation of a transition detected pulse 77 at the output of detector 14. Since this pulse occurs simultaneously with the gating pulse from generator 26, a pulse 78 appears on line 38. Pulse 77 also terminates the gating pulse from generator 26 and resets generators 25 and 26.

The next transition of the data, at 80, causes the generation of a transition detected pulse 81 which occurs prior to the generation of gating pulses by either generators 25 or 26. Accordingly, no inputs are applied to counter 40 and generators 25 and 26 are reset. Generators 25 and 26 subsequently generate gating pulses, at 82 and 83, respectively, both of which are present when the next transition in the data, at 84, generates the next transition detected pulse 85 at the output of detector 14. Accordingly, pulses 86 and 87 are conducted to the A and B inputs, respectively, of counter 40.

The process continues until a sufficient number of transitions occur in the input data to derive a meaningful average frequency of occurrence count in counter 40. This count is then plotted, as shown in FIG. 6, and the inputs on lines 41 and 42 to pulse generator 25 are changed to move the interval to another area within the interval established by generator 26. When each of the incremental areas encompassed by the pulse output of generator 26 have been covered, which may correspond to transitions centered at $t_1$ in FIG. 3, the inputs on all of lines 41–44 are changed to investigate transitions centered around time $t_2$. This procedure permits an accurate measurement of the probability density function associated with transition displacements. Furthermore, this invention permits the measurement of conditional probability such that the probability density function associated with certain selected transitions, such as those occurring at time $t_1$, can be evaluated independently of transitions occurring at times $t_2$ and $t_3$.

In summary, not only does system 10 permit the measurement of the probability density function associated with data transitions, but it does it in a manner which is data independent and conditional. It is data independent because all one needs to know is the practical limits over which transitions can be expected to occur and generator 26 can be utilized to establish a window corresponding to those limits. Pulse generator 25 then investigates smaller windows within the larger window established by generator 26 and the probability density function of transitions occurring during such expected interval can be determined independently of other intervals.

It can therefore be seen that according to the present invention, there is provided a method and means for evaluating phase encoded communication systems which permits a direct measurement of the time displacement of signal transitions from their normal undistorted positions and which give a precise indication of the margin against a wrong decision. The present system does not require the making of assumptions which may not, in practice, be valid. The present system only requires the assumption that the noise associated with transition displacements approximates some stationary random process and that there exists a sample probability density function which is related to the probability density function associated with such transition displacements. By measuring the probability density function associated with transition displacements, the probability of error of the system can be inferred.

Evidently, if the result of system 10 is a probability density function corresponding approximately to waveform 1 of FIG. 1, the probability of error of the system is substantially less than if the measured probability density function approximates waveform 2 of FIG. 1. Rather than attempting to evaluate analytically the probability density function associated with transition displacements, the present method and means permits the direct measurement thereof. Furthermore, the present invention permits the measurement of conditional probability such that the probability density function associated with certain selected transitions can be evaluated, independently of other transitions.

While the invention has been described with respect to the preferred physical embodiment constructed in accordance therewith, it will be apparent to those skilled in the art that various modifications and improvements may be made without departing from the scope and spirit of the invention. For example, while means have been shown which are responsive to transitions in the data for determining the average frequency of occurrence of transitions of the data within a given, narrow time interval which is subsequently varied over a larger interval, it will be obvious to those skilled in the art that such an average frequency of occurrence signal may be simultaneously accumulated over a plurality of narrow intervals within the larger interval. This could be implemented in a number of ways, such as by providing plural pulse generators 25 and plural counters 40, one set for each narrow time interval. Alternatively, other means may be employed for accumulating such information. Accordingly, it is to be understood that the invention is not to be limited by the specific illustrative embodiment, but only by the scope of the appended claims.

We claim:

1. In a system wherein periodic transitions occur in a data signal encoded with a known format and transition displacements occur as a result of bandwidth limitations, noise, and the like, the improvement comprising:
means responsive to transitions of said data signal for establishing a first time interval which follows each transition of said data signal by a second time interval, said first time interval being substantially shorter than the time between consecutive transitions of said data signal;
means for determining the frequency of occurrence of subsequent transitions of said data signal within said first time interval; and
means for varying said second time interval to shift said first time interval over the range of times when transitions of said data signal are expected to occur.

2. In a system according to claim 1, the improvement wherein said first time interval establishing means comprises:
first means responsive to a transition of said data signal for generating a first gating pulse which begins at a known time $t_1$ following said transition and terminates at a known time $t_2$ following said transition, said first gating pulse establishing said first time interval; and wherein said determining means comprises:
first gating means responsive to said data signal and said first gating pulse for passing subsequent transitions of said data signal occurring during said first gating pulse; and
counting means responsive to said first gating means for summing transitions occurring during said first gating pulse.

3. In a system wherein transitions occur in a data signal encoded with a known format and transition displacements occur as a result of bandwidth limitations, noise, and the like, the improvement comprising:
means responsive to transitions of said data signal for establishing a first time interval which follows each transition of said data signal by a second time interval, said first time interval being substantially shorter than the time between consecutive transitions of said data signal; and
means for determining the average frequency of occurrence of transitions of said data signal within said first time interval.

4. In a system wherein transitions occur in a data signal encoded with a known format and transition displacements occur as a result of bandwidth limitations, noise, and the like, the improvement comprising:
means responsive to transitions of said data signal for determining the frequency of occurrence of subsequent transitions of said data signal within a first given time interval;
means responsive to transitions of said data signal for determining the frequency of occurrence of subsequent transitions of said data signal within a second given time interval, said second time interval being substantially greater than and including said first time interval; and
means for dividing the frequency of occurrence of transitions of said data signal within said first time interval by the frequency of occurrence of transitions of said data signal within said second time interval to determine the average frequency of occurrence of transitions of said data signal within said first time interval.

5. In a system according to claim 4, wherein said first time interval follows said transitions of said data signal by a third time interval, the improvement further comprising:
means for varying said third time interval over the range of times encompassed by said second time interval to permit determination of the average frequency of occurrence of transitions of said data signal within a series of time intervals encompassing said second time interval.

6. In a system according to claim 4, the improvement wherein means are provided to permit the determination of the average frequency of occurrence of transitions of said data signal within different first time intervals within the range encompassed by said second time interval.

7. In a system wherein periodic transitions occur in a data signal encoded with a known format and transition displacements occur as a result of bandwidth limitations, noise, and the like, the improvement comprising:
first means responsive to a transition of said data signal for generating a first pulse which begins at a known time $t_1$ following said transition and terminates at a known time $t_2$ following said transition, said first gating pulse establishing a given time interval;
first gating means responsive to said data signal and said first gating pulse for passing subsequent transitions of said data signal occurring during said first gating pulse;
counting means responsive to said first gating means for summing transitions occurring during said first gating pulse;
second means responsive to a transition of said data signal for generating a second gating pulse which begins at a known time $t_3$ following said transition and terminates at a known time $t_4$ following said transition, said time $t_3$ occurring at or prior to said time $t_1$ and said time $t_4$ occurring at or after said time $t_2$, said second gating pulse establishing the time interval during which transitions of said data are expected to occur;
second gating means responsive to said data signal and said second gating pulse for passing subsequent transitions of said data signal occurring during said second gating pulse; and
means for conducting the output of said second gating means to said counting means, said counting means dividing the output of said first gating means by the output of said second gating means to determine the average frequency of occurrence of transitions of said data signal within said time interval from $t_1$ to $t_2$.

8. In a system according to claim 7, the improvement wherein each transition of said data signal resets said first and second gating pulse generating means.

9. In a system according to claim 7, the improvement wherein said second gating pulse generating means is operative, upon the termination of said second gating pulse, to generate an inhibit signal to inhibit further operation of said first and second gating pulse generating means until the next transition of said data signal occurs.

10. In a system wherein transitions occur in a data signal encoded with a known format and transition displacements occur as a result of bandwidth limitations, noise, and the like, the improvement comprising:
means responsive to said data signal for measuring the probability density function of said transition displacements of said data signal, said probability density function measuring means including;
means for limiting said measurement of the probability density function to selected transition displacements of said data signal thereby excluding other transition displacements of said data signal whereby said measuring means measures conditional probability.

11. In a system wherein transitions occur in a data signal encoded with a known format and transition displacements occur as a result of bandwidth limitations, noise, and the like, a method for measuring the probability density function of said transition displacements of said data signal comprising:
measuring the frequency of occurrence of transitions of said data signal within a first time interval;
measuring the frequency of occurrence of transitions of said data signal within a second time interval, said second time interval being substantially greater than and including said first time interval, said second time interval encompassing the time interval during which transitions of said data signal are expected to occur; and
dividing the frequency of occurrence pof transitions of said data signal within said first time interval by the frequency of occurrence of transitions of said data signal within said second time interval to determine the average frequency of occurrence of transitions of said data signal within said first time interval.

12. In a system according to claim 11, the method further comprising:
repeating the above steps for different first time intervals within the range encompassed by said second time interval to determine the average frequency of occurrence of transitions of said data signal within all time intervals encompassed by said second time interval; and
plotting the average frequency of occurrence determined at each such first interval.

* * * * *